US007433797B2

United States Patent
Que et al.

(10) Patent No.: US 7,433,797 B2
(45) Date of Patent: Oct. 7, 2008

(54) METHOD FOR VERIFYING SCAN PRECISION OF A LASER MEASUREMENT MACHINE

(75) Inventors: Ling-Hua Que, Guangdong (CN); Zhong-Kui Yuan, Guangdong (CN); Wei Xu, Guangdong (CN); Xiao-Bo Xin, Guangdong (CN); Kuei-Yang Lin, Guangdong (CN)

(73) Assignees: Hong Fu Jin Precision Industry (Shen Zhen) Co., Ltd., Longhua Twon, Bao'an District, Shenzhen, Guandong Province; Hon Hai Precision Industry Co., Ltd., Tu-Cheng, Taipei Hsien (TW)

( * ) Notice: Subject to any disclaimer, the term of this patent is extended or adjusted under 35 U.S.C. 154(b) by 399 days.

(21) Appl. No.: 11/308,314

(22) Filed: Mar. 16, 2006

(65) Prior Publication Data

US 2006/0221349 A1 Oct. 5, 2006

(30) Foreign Application Priority Data

Apr. 1, 2005 (CN) .......................... 2005 1 0033934

(51) Int. Cl.
*G01C 9/00* (2006.01)

(52) U.S. Cl. ..................................... 702/150; 702/152
(58) Field of Classification Search ........................ None
See application file for complete search history.

(56) References Cited

U.S. PATENT DOCUMENTS

| 7,047,151 | B2 * | 5/2006 | Chang ......................... 702/152 |
| 7,228,254 | B2 * | 6/2007 | Numata et al. .............. 702/168 |
| 2001/0024309 | A1 | 9/2001 | Shim | |

FOREIGN PATENT DOCUMENTS

WO WO 2004/051179 A1 6/2004

\* cited by examiner

*Primary Examiner*—Michael P Stafira
(74) *Attorney, Agent, or Firm*—Winston Hsu

(57) ABSTRACT

A method for verifying scan precision of a laser measurement machine includes the steps of: preparing a standardized 3D profile model; determining an ideal curved surface as a conventional true value of the standardized 3D profile model; scanning the standardized 3D profile model by the laser measurement machine and obtaining point cloud data; calculating a bias between each point in the point cloud and the ideal curved surface; evaluating the veracity of the laser measurement machine by using the largest bias; and evaluating the receptiveness of the laser measurement machine.

4 Claims, 2 Drawing Sheets

METHOD FOR VERIFYING SCAN PRECISION OF A LASER MEASUREMENT MACHINE

FIELD OF THE INVENTION

The present invention generally relates to methods for verifying measurement precision, and more particularly to a method for verifying scan precision of a laser measurement machine.

DESCRIPTION OF RELATED ART

Product quality has long been one of the most important factors in maintaining a typical manufacturing enterprise's competitiveness. How to improve the quality of products is an important ongoing pursuit of such an enterprise. Therefore, it is essential to verify whether specifications of products meet with user requirements before a batch production. For a BGA (Ball Grid Array), a 3D profile or a transparent part, conventional measure methods are using CCD (Charge Coupled Device) to measure or using a contact scanning probe to process contact measurement.

Today, laser can be found in a broad range of applications within the industry, where it can be used for such things as pointing and measuring. In the manufacturing industry, laser is used to measure the ball cylindricity in bearings by observing the dispersion of a laser beam when reflected on the ball. Another example is to measure the shadow of a steel band by using a laser beam to find out the thickness of the band. More and more industrial processes require or prefer non-contact measurement. Laser measurement provides a new approach to control the production and quality of products. Sensitive materials that are previously considered difficult or even impossible to measure because they are hot, soft, sticky, elastic, sterile or moving fast, can now be measured precisely by using laser measurement. Laser measurement has no influence on the material, and the material has little influence on the measurement. In a sense, laser measurement is more than only an alternative. The rapid response of these non-contact measuring systems ensures their easy integration into production processes and industrial control systems. 100% online quality control can be guaranteed. With the applications of laser measurement technology in measurement field, a great variety of laser measurement machines are manufactured. Before using a certain laser measurement machine to measure objects, users need to verify scan precision of the laser measurement machine, in order to ensure measurement veracity. If the precision doesn't meet with user requirements, the users need to debug the laser measurement machine, and correct it to be acceptable. However, generally, manufacturers only provide users with reference scan precision of laser measurement machines, but don't provide methods for verifying scan precision of the laser measurement machines.

What is needed, therefore, is a method for verifying scan precision of a laser measurement machine, which can confirm the scan precision of the laser measurement machine, in order to provide user dependable measuring results.

SUMMARY OF INVENTION

One embodiment provides a method for verifying scan precision of a laser measurement machine. The laser measurement machine is connected with a computer. The method includes the steps of: (a) preparing a standardized 3D profile model; (b) determining an ideal curved surface as a conventional true value of the standardized 3D profile model; (c) scanning the standardized 3D profile model by the laser measurement machine and obtaining point cloud data; (d) calculating a bias between each point in the point cloud and the ideal curved surface; (e) evaluating the veracity of the laser measurement machine by using the largest bias; and (f) evaluating the receptiveness of the laser measurement machine.

Other objects, advantages and novel features of the embodiments will be drawn from the following detailed description together with the attached drawings, in which:

DETAILED DESCRIPTION

Figure 1:
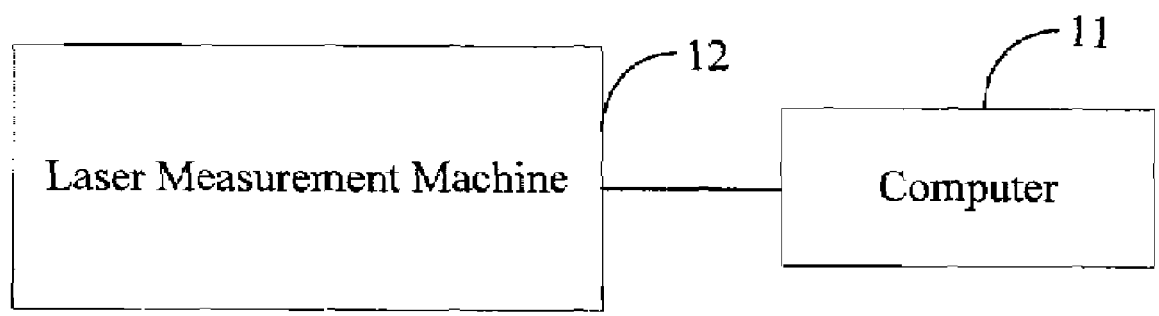
FIG. 1 is a schematic diagram of hardware configuration of a system for verifying scan precision of a laser measurement machine when measuring a 3D (three-dimensional) profile in accordance with a preferred embodiment.

FIG. 1 is a schematic diagram of hardware configuration of a system for verifying scan precision of a laser measurement machine when measuring a 3D (three-dimensional) profile (hereinafter, "the system"), in accordance with a preferred embodiment. The system typically includes a computer 11, and a laser measurement machine 12 for a 3D profile to be laid thereon for measurement. The computer 11 is connected with the laser measurement machine 12 via a data bus. The computer 11 is installed with particular software for controlling the laser measurement machine 12 to measure the 3D profile. In addition, the computer 11 also stores particular measuring data and calculating data used for verifying scan precision of the laser measurement machine 12.

Figure 2:
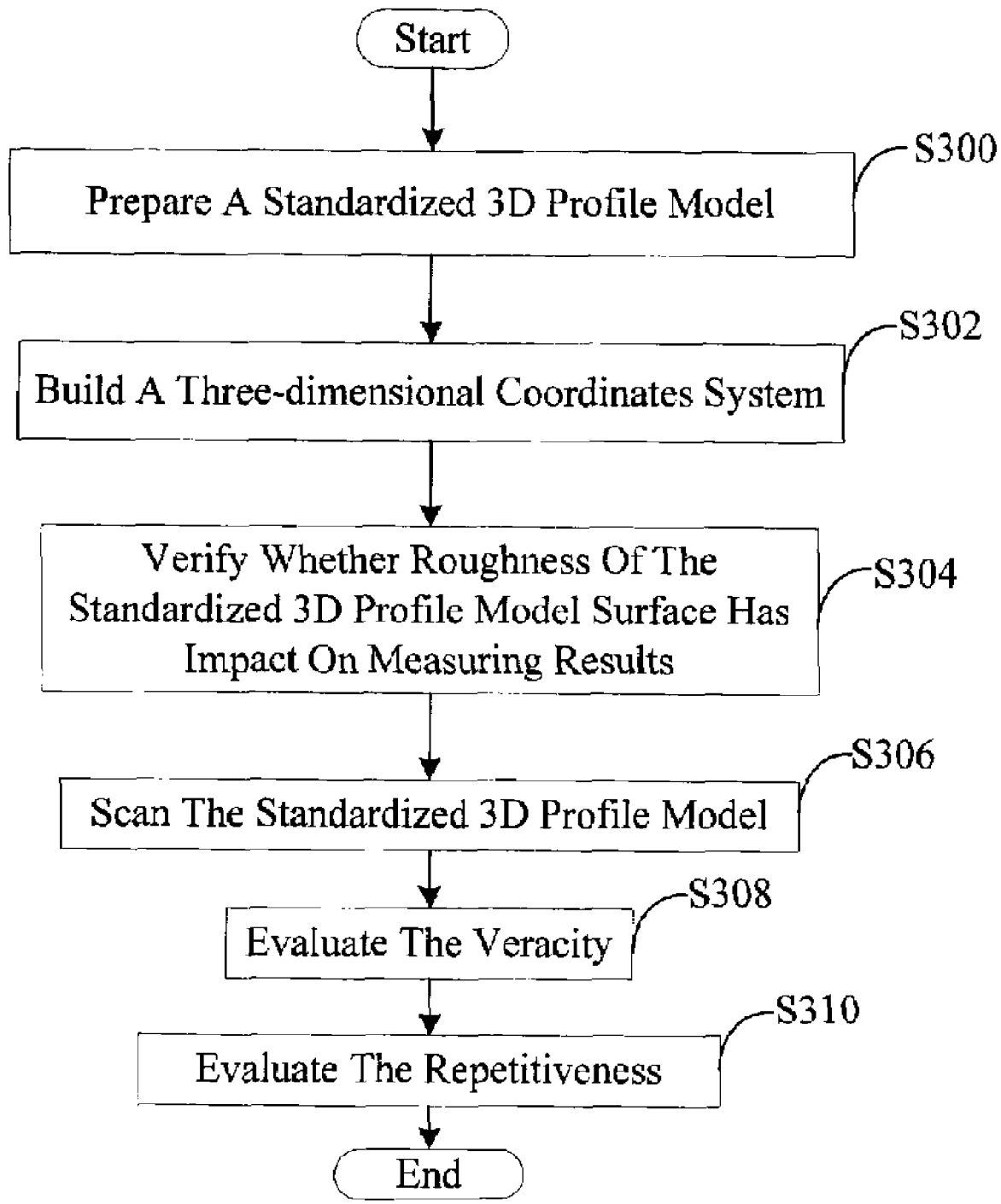
FIG. 2 is a flow chart of a method for verifying scan precision of a laser measurement machine when measuring a 3D profile in accordance with a preferred embodiment.

FIG. 2 is a flow chart of a preferred method for verifying scan precision of the laser measurement machine 12 when measuring a 3D profile. In the preferred embodiment, the 3D profile is exampled by a sphere profile. In step S300, a standardized 3D profile model with a sphere profile is prepared according to particular requirements. The requirements may include that: the standardized 3D profile model is part of a sphere, whose diameter is big enough, for example, more than 120 mm; the flatness of each plane of the standardized 3D profile model should not be more than 2 μm; the parallelism for each pair of parallel planes and verticality for each pair of orthogonal planes should not be more than 3 μm; the roughness of the spherical surface should be tiny, for example, not more than 0.1 μm when the spherical surface is polished.

In step S302, a three-dimensional coordinates system is built as a scanning measure standard in order to obtain measuring data in the same three-dimensional coordinates system. In order to verify whether the roughness of the standardized 3D profile model surface has impact on measuring results, in step S304, a contact scanning probe scans the standardized 3D profile model based on the scanning measure standard before the standardized 3D profile model is polished. First point cloud data are obtained by scanning the standardized 3D profile model, and stored in the computer 11 connected with the laser measurement machine 12. The first point cloud data include X, Y, Z coordinates values of a plurality of discrete scanned points in the three-dimensional coordinates system. The computer 11 fits the first point cloud data into a first ideal curved surface, and calculates a bias between each scanned point in the first point cloud and the first ideal curved surface by invoking and executing software named Metris which is installed in the computer 11. The largest bias is used to verify whether the precision of the standardized 3D profile model meets with measuring requirements. If the precision of the standardized 3D profile model satisfies the measuring requirements, the first ideal curved surface is regarded as a conventional true value of the standardized 3D profile model before polishing, and stored in the computer 11. Then, the laser measurement machine 12 scans the standardized 3D profile model based on the scanning measure standard built above before the standardized 3D profile model is polished, and obtains second point cloud data. The computer 11 calculates a bias between each scanned point in the second point cloud and the first ideal curved surface by invoking and executing the Metris software, and obtains a largest bias called a first bias, which equals 0.017 mm in the preferred embodiment. In a similar way, the contact scanning probe scans the standardized 3D profile model based on the scanning measure standard after the standardized 3D profile model is polished. Third point cloud are obtained and stored in the computer 11. The computer 11 fits the third point cloud data into a second ideal curved surface, and calculating a bias between each scanned point in the third point cloud and the second ideal curved surface by invoking and executing the Metris software. The largest bias is used to verify whether the precision of the standardized 3D profile model after polishing meets with measuring requirements. If the precision of the polished standardized 3D profile model satisfies the measuring requirements, the second ideal curved surface is regarded as a conventional true value of the standardized 3D profile model after polishing, and stored in the computer 11. Then, the laser measurement machine 12 scans the standardized 3D profile model based on the scanning measure standard built above after the standardized 3D profile model is polished, and obtains fourth point cloud data. The computer 11 calculates a bias between each scanned point in the fourth point cloud and the second ideal curved surface by invoking and executing the Metris software, and obtains a largest bias called a second bias, which equals 0.008 mm in the preferred embodiment, smaller than the first bias equaling 0.017 mm. It means that the veracity of the laser measurement machine 12 is better if the laser measurement machine 12 scans the polished standardized 3D profile model.

In step S308, the laser measurement machine 12 scans the polished standardized 3D profile model under a scanning mode and the same scanning parameters for certain times. The scanning mode may be Spiral, Circle, Zigzag or Area. The scanning parameters include scanning speed and scanning precision. In order to evaluate the veracity of the laser measurement machine 12, in the preferred embodiment, the polished standardized 3D profile model is scanned for three times. Accordingly, three largest biases are calculated. Supposing the three largest biases are 8 μm, 7 μm and 7 μm respectively, the largest one 8 μm is regarded as the veracity of the laser measurement machine 12. During the scanning process, three point clouds are obtained in sequence. In order to evaluate the repetitiveness of the laser measurement machine 12, in step S310, a Computer Aided Verification (CAV) is executed for each point cloud, in order to determine a degree of departure from the second ideal curved surface generated in step S304. The CAV can compare a point cloud with the second ideal curved surface quickly and accurately, and mark difference ranges in different colors on a display. The CAV can show where and how a compared object is different from an ideal object, and can greatly improve the efficiency and accuracy of the verification. In the preferred embodiment, the results of the CAV indicate that the repetitiveness of the laser measurement machine 12 is acceptable, under the condition that the scanning veracity of the laser measurement machine 12 is verified to 8 μm. The scan precision of the laser measurement machine 12 is evaluated according to the verified scanning veracity and repetitiveness.

It should be emphasized that the above-described embodiments of the present invention, particularly, any "preferred" embodiments, are merely possible examples of implementations, merely set forth for a clear understanding of the principles of the invention. Many variations and modifications may be made to the above-described embodiment(s) of the invention without departing substantially from the spirit and principles of the invention. All such modifications and variations are intended to be included herein within the scope of this disclosure and the present invention and protected by the following claims.

What is claimed is:

1. A computer-based method for verifying scan precision of a laser measurement machine, the method comprising the steps of:
   preparing a standardized 3D profile model;
   determining an ideal curved surface as a conventional true value of the standardized 3D profile model;
   scanning the standardized 3D profile model by the laser measurement machine and obtaining point cloud data;
   calculating a bias between each point in the point cloud and the ideal curved surface;
   evaluating the veracity of the laser measurement machine by using the largest bias; and
   evaluating the receptiveness of the laser measurement machine.

2. The method according to claim 1, wherein the point cloud data include X, Y, Z coordinates values of scanned points of the standardized 3D profile model in a three-dimensional coordinates system.

3. The method according to claim 1, wherein the step of determining an ideal curved surface as a conventional true value of the standardized 3D profile model comprises:
   scanning the standardized 3D profile model by a scanning probe before the standardized 3D profile model is polished, and obtaining first point cloud data;
   fitting the first point cloud data into a first ideal curved surface, and calculating a bias between each point in the first point cloud and the first ideal curved surface;
   verifying whether the precision of the standardized 3D profile model before polishing satisfies measuring requirements by using the largest bias;
   scanning the standardized 3D profile model by the laser measurement machine before the standardized 3D profile model is polished, and obtaining second point cloud data, if the precision of the standardized 3D profile model before polishing satisfies the measuring requirements;
   calculating a bias between each point in the second point cloud and the first ideal curved surface and obtaining a largest bias called a first bias;
   scanning the standardized 3D profile model by the scanning probe after the standardized 3D profile model is polished, and obtaining third point cloud data;
   fitting the third point cloud data into a second ideal curved surface, and calculating a bias between each point in the third point cloud and the second ideal curved surface;
   verifying whether the precision of the standardized 3D profile model after polishing satisfies the measuring requirements by using the largest bias;
   scanning the polished standardized 3D profile model by the laser measurement machine, and obtaining fourth point cloud data, if the precision of the polished standardized 3D profile model satisfies the measuring requirements;

calculating a bias between each point in the fourth point cloud and the second ideal curved surface and obtaining a largest bias called a second bias;

comparing the second bias with the first bias; and regarding the second ideal curved surface as the conventional true value of the standardized 3D profile model if the second bias is smaller than the first bias.

4. The method according to claim 1, wherein the step of evaluating the receptiveness of the laser measurement machine comprises the steps of:

executing a Computer Aided Verification for each point cloud obtained after scanning the standardized 3D profile model by the laser measurement machine; and determining a degree of departure from the ideal curved surface.

* * * * *